United States Patent [19]
Hines

[11] Patent Number: 4,980,694
[45] Date of Patent: Dec. 25, 1990

[54] PORTABLE COMMUNICATION APPARATUS WITH FOLDED-SLOT EDGE-CONGRUENT ANTENNA

[75] Inventor: John N. Hines, Morristown, N.J.

[73] Assignee: GoldStar Products Company, Limited, Scottsdale, Ariz.

[21] Appl. No.: 338,180

[22] Filed: Apr. 14, 1989

[51] Int. Cl.[5] .................... H01Q 1/240; H01Q 21/000; H01Q 13/080; H04B 1/380

[52] U.S. Cl. .................... 343/702; 343/700 MS File; 343/853; 455/89

[58] Field of Search ................ 343/700 MS File, 702, 343/829, 846, 853; 455/89, 90, 344, 317, 351

[56] References Cited

U.S. PATENT DOCUMENTS

| | | | |
|---|---|---|---|
| 3,736,511 | 5/1973 | Remmels et al. | 343/702 |
| 4,070,676 | 1/1978 | Sanford | 343/700 MS File |
| 4,078,237 | 3/1978 | Kaloi | 343/700 MS File |
| 4,089,003 | 5/1978 | Conroy | 343/700 MS File |
| 4,095,227 | 6/1978 | Kaloi | 343/700 MS File |
| 4,123,756 | 10/1978 | Nagata et al. | 343/702 |
| 4,197,544 | 4/1980 | Kaloi | 343/700 MS File |
| 4,218,682 | 8/1980 | Yu | 343/700 MS File |
| 4,401,988 | 8/1983 | Kaloi | 343/700 MS File |
| 4,625,212 | 11/1986 | Oda et al. | 343/702 |
| 4,641,366 | 2/1987 | Yokoyama et al. | 455/89 |
| 4,644,361 | 2/1987 | Yokoyama | 343/700 MS File |
| 4,660,048 | 4/1987 | Doyle | 343/700 MS File |
| 4,700,194 | 10/1987 | Ogawa et al. | 343/700 MS File |
| 4,701,763 | 10/1987 | Yamamoto et al. | 343/700 MS File |
| 4,723,305 | 2/1988 | Phillips et al. | 455/89 |
| 4,724,443 | 2/1988 | Nysen | 343/700 MS File |
| 4,783,661 | 11/1988 | Smith | 343/700 MS File |
| 4,800,392 | 1/1989 | Garay et al. | 343/700 MS File |
| 4,835,538 | 5/1989 | McKenna et al. | 343/700 MS File |
| 4,835,541 | 5/1989 | Johnson et al. | 343/700 MS File |

FOREIGN PATENT DOCUMENTS

| | | | |
|---|---|---|---|
| 60-134605 | 7/1985 | Japan | 343/700 MS File |
| 0023423 | 1/1986 | Japan | 455/89 |
| 0277801 | 12/1987 | Japan . | |

OTHER PUBLICATIONS

"UHF Bent-Slot Antenna System for Portable Equipment-I" by H. Koboyama et al., *IEEE Transactions on Vehicular Technology*, vol. VT-36, No. 2, May 87, pp. 78-85.

*Primary Examiner*—Rolf Hille
*Assistant Examiner*—Peter Toby Brown
*Attorney, Agent, or Firm*—Charles S. Phelan

[57] ABSTRACT

A portable radiotelephone unit is provided with an internal antenna in a space between an internal, electrically conductive enclosure for electrical apparatus of the unit and an external, electrically nonconductive housing of the unit. The antenna is a microstrip, folded-slot, edge-congruent device comprising a stack of alternate, electrically conductive layers and dielectric layers. A high frequency band antenna module and a low frequency band antenna module are included in the antenna, and all layers of that antenna are dimensioned to determine, at least in part, the frequency characteristics of the antenna. Perpendicular and parallel attachments are shown for a feed cable extending, via a hole in the enclosure, between the antenna and radiotelephone unit electrical apparatus within the enclosure.

5 Claims, 2 Drawing Sheets

PORTABLE COMMUNICATION APPARATUS WITH FOLDED-SLOT EDGE-CONGRUENT ANTENNA

BACKGROUND OF THE INVENTION

This invention relates to a portable radio communication unit, and it relates more particularly to such a unit with an antenna substantially within the profile of such unit. The term "radio communication unit" includes, for example, a radio paging unit, a cordless telephone handset that is normally useful with only a single base station having an assigned directory number, and a readily transportable radiotelephone transceiver that has its own directory number and is normally useful with any base station to which it may be close. The invention is considered herein, for convenience and without limit intended, in relation to a hand-held portable radiotelephone unit.

There have been a number of efforts in the past to provide an antenna inside a portable radio communication unit for at least the purpose of signal reception and in some cases for signal transmission as well. Such efforts have sought at least to reduce the need to have an external rod or whip antenna because of the inconveniences of handling and carrying such a unit with the external antenna extended. This has even been true of portable radiotelephone units operating in relatively high frequency ranges such as those of the cellular radiotelephone systems where a suitable rod antenna may be about six inches long.

Microstrip-type antennas have been known in the art for applications in which a thin antenna was required, and such antennas have been devised in which the antenna could be made to conform to a curved surface such as the surface of an aircraft or a missile. Such an antenna is shown in the U.S. Pat. Nos. 4,078,237 and 4,095,277 to C. M. Kaloi. However, these antenna systems usually include a ground plane member of at least one wavelength in dimension beyond each edge of the associated radiator element. The need for such a large antenna component makes these antennas unsuitable for use as an antenna in a portable radiotelephone unit that operates in, e.g., the 900 megahertz (MHz) frequency spectrum region and that should have a hand-held level of portability.

Efforts to provide an antenna, or otherwise eliminate the need for a protruding antenna, have included various contrivances. One example is shown in the U.S. Pat. No. 3,736,591 to L. W. Rennels et al. where selected conductive walls of an equipment housing are employed as part of a loop antenna for reception, but one portion is extended for transmission. The U.S. Pat. No. 4,723,305 to J. P. Phillips et al. illustrates an example in which a notch antenna is formed as a part of, and dividing the internal volume of, a conductive equipment housing in a portable radiotelephone unit. Yet another example, U.S. Pat. No. 4,641,366 to Y. Yokoyama et al., shows a portable radiotelephone unit having dual-band capability and in which a conductive casing has a recessed surface to which two, side-by-side, radiating plate antennas are electrically connected to form, with the conductive casing, a dual-band antenna system. These efforts usually have involved either substantial intrusions into the limited space available for housing transmitter/receiver electronic apparatus or substantial complexity, either or both of which factors render manufacturing difficult and costly.

SUMMARY OF THE INVENTION

The foregoing difficulties are eased in accordance with the present invention by employing a microstrip, folded-slot, edge-congruent antenna.

In one embodiment, the antenna comprises a stack of alternate conductive and dielectric layers forming at least one microstrip antenna module. Such layers of a lowest-frequency-band antenna module of the antenna system are all edge-congruent and dimensioned to determine the frequency characteristics of the module.

A radio communication unit, including electric communication apparatus inside a housing, has the aforementioned microstrip, folded-slot, edge-congruent antenna secured to a wall of the housing. The antenna width dimension is oriented parallel to a wall of the housing and a ratio of antenna width to antenna depth is selected, depending upon the dielectric permittivity, to fix a predetermined frequency bandwidth to be favored by the antenna. A feed cable is extended from the antenna to electrical apparatus within the housing.

BRIEF DESCRIPTION OF THE DRAWING

A more complete understanding of the invention and its features, objects, and advantages can be derived from a consideration of the following detailed description and the appended claims in connection with the attached drawings in which:

DETAILED DESCRIPTION

Figure 1:
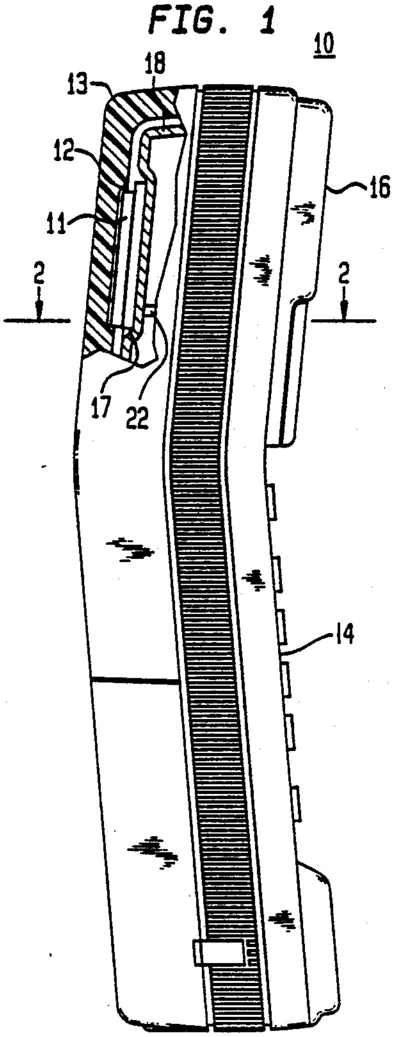
FIG. 1 is a side view, partly broken open, of a portable radiotelephone unit in accordance with the present invention.
Figure 7:
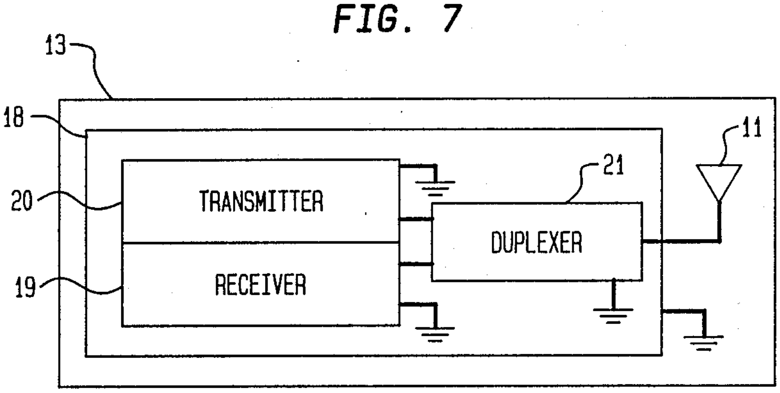
FIG. 7 is an electro-mechanical schematic diagram of the radiotelephone unit of FIG. 1.

In FIG. 1 a hand-held, portable, type of radiotelephone unit 10 has the upper left portion thereof broken away to show a microstrip, dual, folded-slot, edge-congruent antenna 11 installed within the unit. Antenna 11 will be described in greater detail below. Although the antenna can be installed in locations within or outside the unit 10, it is presently preferred that it be bonded, e.g. by conductive epoxy glue, to the bottom of a depression 17 in one wall of a conductive enclosure 18 for the electrical equipment of the unit 10. In that location it is approximately parallel to the wall of enclosure 18. Antenna 11 also extends into a recess 12 in, and is approximately parallel to, an interior wall of an electrically nonconductive housing 13 for the unit. Antenna 11 can touch the bottom of recess 12 or a space can be left between antenna 11 and the bottom of recess 12 to be filled with a suitable nonconductive filler or left open as illustrated. Enclosure 18 illustratively contains electrical apparatus, such as a receiver 19 a transmitter 20 and a duplexer 21, for the unit 10 as shown in the electromechanical schematic diagram of FIG. 7. Receiver 19 and transmitter 20 are sometimes herein for convenience referenced together as a transceiver.

If antenna 11 were held out of contact with conductive enclosure 18, leaving a space between them at the bottom of recess 17, that space would be expected to be excited by the antenna E field that is 180° out of phase; and that would tend to cancel the radiated field. The cancellation effect is expected to be apparent for spacings of small fractions of a wavelength and to be virtually negligible for spacings of one-quarter wavelength and larger.

Recess 12 is illustratively located in a back wall of the housing 13 opposite an ear portion 16 of the unit and in positional registration with the depression 17. Thus, the antenna is positioned in the upper portion of the radiotelephone unit 10 so that it is above the region usually grasped by a user of the unit; and antenna operation will be relatively unobstructed by the user's hand. Generally, a user grasps the unit in a more centrally located region, e.g., behind a keypad 14 for the unit.

Antenna 11 illustratively comprises a high band module and a low band module, as will be discussed in greater detail in relation to FIGS. 3 and 4. More or less than two modules also can be employed. The high band module is illustratively within the recess 12, and the low band module is disposed in a depression 17 in the wall of enclosure 18. However, for reasons that will be subsequently discussed, the antenna can also be inverted so that the low frequency module is in recess 12 and the high frequency module is in depression 17. A section of a feed cable 22 also appears in FIG. 1 where it passes, through a hole (not shown in FIG. 1) in enclosure 18, between the antenna 11 and the apparatus (not shown in FIG. 1) within enclosure 18.

Figure 2:
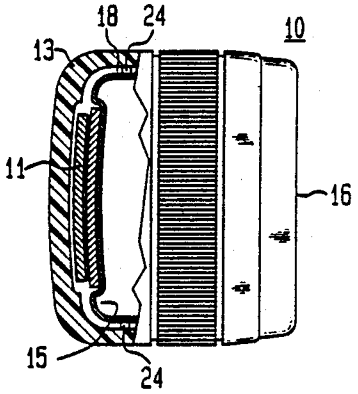
FIG. 2 is a top view, partly broken open, of the radiotelephone unit of FIG. 1.

FIG. 2 is a top view of the unit of FIG. 1, and it too is partially broken away to show a portion of a cross section of the unit 10 at the plane 2, 2 in FIG. 1, just below the access point for cable 22. Enclosure 18 is secured to housing 12 by any suitable mechanism, as schematically represented by fasteners 24 in FIG. 2. Thus, antenna 11 is secured to housing 13 by virtue of being secured to enclosure 18 which is in-turn secured to housing 13.

It is evident in FIG. 2 that the bottom of recess 17 is concave and that antenna 11 is bent to conform to that curvature. This causes the antenna also to conform to the curvature at the bottom of recess 12 in housing 13, which has its back wall curved to lend an attractive appearance to the unit 10. Thus, the antenna 11 occupies only a relatively small part of the volume that would otherwise be available within enclosure 18 if no internal antenna were provided. At the same time, however, antenna 11 utilizes essentially the full available internal width dimension of housing 13 to take advantage of that aspect for achieving bandwidth requirements as will be subsequently further discussed. Part of the volume occupied by the antenna is realized by a relatively small thinning in the wall of housing 13 and so does not reduce space available for electrical apparatus of the unit at all. Even the curvature of the housing 13 provided to enhance its appearance is utilized as shown in FIG. 2 to reduce the volume incursion into enclosure 18. If the back wall of housing 13 were thick enough, antenna 11 could project almost completely into a deeper recess 12 and would not require a depression in enclosure 18 but could be simply secured to a flat outer wall thereof. However in the illustrative embodiment, such additional thickness for walls of housing 13 is not required for strength and would unduly increase the weight of the unit 10. Narrow gutters, such as the gutter 15 in FIG. 2, surround the depression 17 inside enclosure 18 and constitute a convenient channel for routing cable 22, if necessary, without extending further into the interior of the enclosure. The gutter also provides opportunity to accommodate tall components (not shown) on circuit boards (not shown) within enclosure 18 and which components would otherwise be too tall to be located in line with edges of the curved bottom of depression 17.

Figure 3:
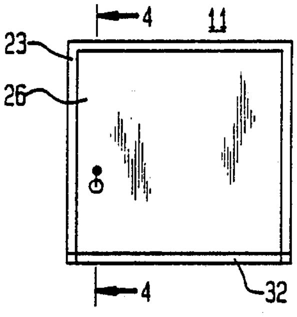
FIGS. 3 and 4 are plan and side views, respectively, of a microstrip, folded-slot, edge-congruent antenna in accordance with the present invention and employed in the radiotelephone unit of FIG. 1.
Figure 4:
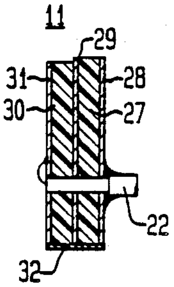

Antenna 11 is considered in greater detail in connection with FIGS. 3 and 4 and wherein FIG. 4 is a cross sectional view taken at plane 4, 4 in FIG. 3. The antenna is a microstrip type comprising alternate layers of electrically conductive and dielectric materials stacked together; and it includes at least one antenna module, i.e. at least one set of conductive and dielectric layers so dimensioned as to favor electromagnetic wave radiation/interception in a frequency band having a center frequency determined by the dimensions of those layers. Such an antenna module exhibits a return loss versus frequency characteristic with at least a predetermined level of return loss across the frequency band of interest. The antenna module usually exhibits a return loss peak at approximately the center frequency of that band. Each layer includes two major surfaces defined by edges, the layer having a thickness much less than the extent of such surfaces, i.e. a small fraction of a wavelength at any frequency of a band favored by the antenna.

A lowest frequency module of an antenna stack includes a dielectric layer having a conductive layer applied to the full extent of each of its major surfaces, the three layers being dimensioned to fix the desired frequency characteristics of that module. Any higher frequency module of the antenna is similarly configured, i.e. a dielectric layer plated on both sides with conductive material; but in practice it has been found that, since the modules are stacked with adjacent conductive layers in contact, a higher frequency module need include only one conductive layer on a dielectric layer, both layers being dimensioned to fix the desired frequency characteristics of the higher frequency module. The higher frequency module functionally shares a conductive layer with the next lower frequency module with which it is in contact in the stack of layers, and that shared layer is dimensioned to achieve the frequency characteristics of the lower frequency module. Since all layers of any particular antenna module are dimensioned the same, i.e. according to the same set of frequency characteristics and lacking an integral ground plane layer of dimension not primarily determined to fix desired frequency characteristics, the antenna 11 is said to be edge-congruent.

In the illustrative embodiment, two modules are provided, a low frequency, or transmit, module 23 and a high frequency, or receive, module 26. Low frequency module 23 includes a layer, or board, 27 of dielectric material, best seen in FIG. 4, having a conductive material such as copper applied, e.g. by plating, to the full extent of both sides, i.e. conductor elements 28 and 29. Similarly, the high frequency module 26 includes a board 30 of dielectric material having a conductive material such as copper plated on the full extent of one side, i.e. conductive layer 31; and the other side of board 30 is bonded to the conductive element 29 in lieu of having another conductive element bonded to that side. One suitable bonding material is ethyl cyanoacrylate adhesive.

For manufacturing convenience, rectangular layers of the antenna 11 are advantageously stacked with one edge of each element in alignment with a corresponding edge of each other element of the stack. That is, the corresponding edges are all parallel to one another; and all such corresponding edges lie in the same plane. In that stacked arrangement, each higher frequency antenna module, e.g. 26, is illustratively symmetrically located, equidistant from the edges perpendicular to that same plane of the next lower frequency module, e.g. 23, of the stack. Exact symmetry is not required for satisfactory operation, but it is preferred that a high frequency module not overlap an edge of a lower frequency module. A conductive short circuiting member 32, such as a film of silver paint or conductive epoxy, is applied across the full extent of all of the aligned edges of the conductive and dielectric layers 27-31.

An antenna module, such as the low frequency module 23 including short circuiting member 32, resembles a cavity-backed slot antenna for which the cavity has been reduced to its smallest size with the slot wrapped around three edges of the resulting module. Such an antenna module is here called a microstrip, folded-slot, edge-congruent, antenna module; and the illustrated overall antenna 11 is said to be a microstrip, dual, folded-slot, edge-congruent antenna.

In FIGS. 3 and 4, an antenna module dimension from the short circuited edge to the opposite edge (i.e. from member 32 to top of the module 23 in FIG. 3) is fixed at approximately one-quarter wavelength in the dielectric at the center frequency of the band of interest. Thus, in the illustrative embodiment, that dimension for the low and high frequency modules 23 and 26, respectively, is one-quarter wavelength at approximately the centers of the transmit and receive bands, respectively, of the frequency spectrum available for cellular radiotelephone in the United States of America. In actual practice, it has been found that when the antenna is at least partially assembled into a depression, such as the depression 17 in conductive enclosure 18 and recess 12 in nonconductive housing 13, the frequency characteristics of both high and low bands are down shifted, without other significant change, by about three MHz. The aforementioned frequency-determining dimension of an antenna module can be slightly reduced to compensate for that effect if the shift, i.e. of about 0.3%, is important for a particular application.

It is known to select microstrip antenna width in the direction parallel to the shorted edges (i.e. horizontally in FIG. 3), dielectric material thickness, and dielectric constant to determine frequency bandwidth. The folded-slot edge-congruent antenna depicted here employs that bandwidth aspect advantageously to improve space utilization efficiency within the radiotelephone unit 10. Thus, in the illustrative embodiment, the antenna width dimension is oriented essentially parallel to facing walls of housing 13 and enclosure 18. That width dimension can be the same for all modules required to operate at different frequencies, but the illustrated arrangement with modules of different widths is preferred. The ratio of antenna width to stack depth (the horizontal dimension in FIG. 4) is selected to fix a predetermined frequency bandwidth to be favored by the antenna. Specifically, the width of low frequency antenna module 23 is made as large as is possible within the nonconductive housing 18. A dielectric material is employed having a dielectric constant and thickness chosen to enable use of as much as necessary of the allotted space between bottom walls of recess 12 and depression 17 to achieve the desired bandwidth in the low frequency band, i.e. in the cellular radio transmit band for portable units.

A dielectric material employed in the illustrative embodiment is a bendable laminate of 1.524 millimeter (0.060 inch) thickness, having a grade designation BEND/flex 2412060 and a dielectric constant of 3.43, manufactured for commercial sale by the Rogers Corporation, of Rogers, Connecticut. Conductive elements 27, 29, and 31 in that embodiment were one-ounce (0.07 mm thick) copper. In one embodiment that was designed for cellular radio application the above mentioned dielectric material was employed: and module dimensions as viewed in FIG. 3 were, for the low frequency antenna module 23, 44.0 mm (1.73 inches) in width by 49.6 mm (1.95 inches) in height, and, for the high frequency antenna module 26, 40.0 mm (1.57 inches) in width by 46.5 mm (1.83 inches) in height. The antenna feed point was located 11.3 mm above the short circuiting member 32 and 2.5 mm in from the left-hand edge of the module.

From the foregoing, it is apparent that in a folded-slot, edge-congruent antenna every module includes at least one dielectric layer and one or more electrically conductive layers. All layers of a module are congruent at edges of major surfaces with edges of at least one other layer, and each layer is dimensioned to fix, at least in part, frequency characteristics of one module of the antenna.

In FIG. 4, the antenna feed cable 22 approaches antenna 11 perpendicularly to the major surfaces of the stacked modules and parallel to the longitudinal direction of the stacking. The cable 22 is connected to the exterior modules, i.e. 23 and 26, of the stacked modules. To that end, a shielding outer conductor of the cable 22 is soldered to the low frequency module exterior conductive layer 28. The center conductor and insulating spacer of the cable are passed through a hole through the antenna layers at a feed point determined to have an impedance resistive component approximately equal to the resistive component of the characteristic impedance of the cable. The insulating spacer ends at the exterior surface of the high frequency module, and the center conductor is soldered to the exterior conductor element 31 of that module adjacent to the mentioned hole. Although it might be expected that the selection of a feed point on antenna 11 would be a compromise between points suitable for the center frequencies of the high and low frequency bands, it has been found that the exact location of the feed point is not critical to good performance.

One advantage of the dual folded slot antenna illustrated in FIGS. 3 and 4 is that, because it operates without a large ground plane, the feed cable can be brought in from either the high or the low frequency side of the antenna. In either case, a shield conductor on the cable is connected to the near conductive layer of the stack, and the center conductor of the cable is connected to the conductive layer on the opposite side of the stack after passing through all layers of the stack. Also, because of the lack of an integral ground plane element in the antenna, the entire antenna is separately manufacturable and thereafter assembled into a radio unit at a convenient location.

The antenna as illustrated in FIGS. 3 and 4, without contact with a larger conductive element for ground reference (except through the shield of cable 22), operates satisfactorily for some purposes when connected to radiotelephone equipment. However, when the antenna is assembled with a radio unit housing, it is usually brought into close proximity with a conductive equipment enclosure such as enclosure 18. If, as mentioned before, the antenna does not broadly contact that enclosure, it is expected that the intervening space will be excited and produce a canceling effect in a direction perpendicular to the plane of the drawing in FIG. 4. Therefore, if a conductive enclosure is employed in the radio unit, it is preferred that the antenna be assembled into electrical contact with that enclosure, e.g. as illustrated in FIGS. 1 and 2.

Figure 5:
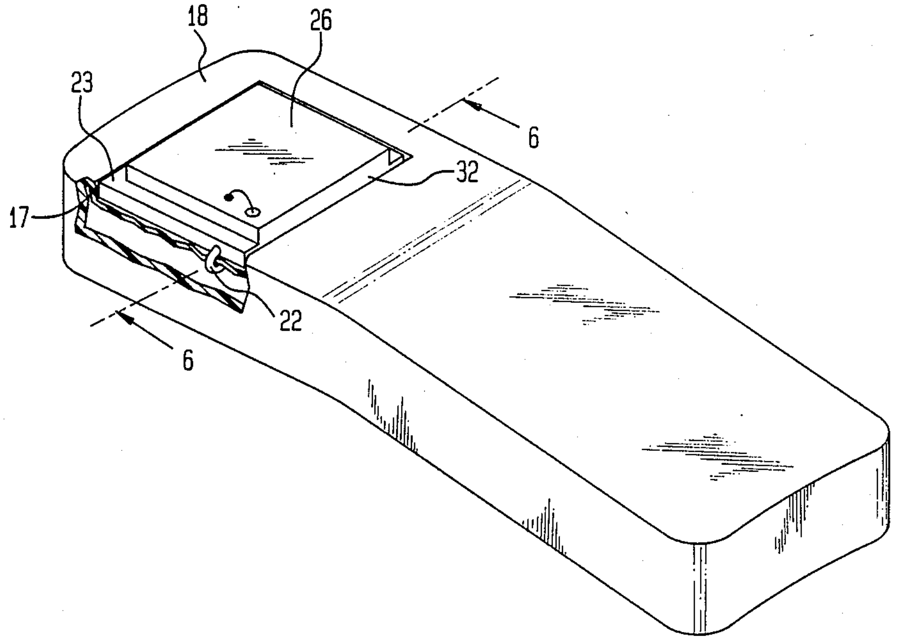
FIG. 5 is a perspective view of an electrical apparatus enclosure in association with the antenna of FIGS. 3 and 4 as employed in the radiotelephone unit of FIG. 1.

FIG. 5 depicts a somewhat enlarged perspective view of the conductive equipment enclosure 18 removed from the nonconductive housing 13 and having the antenna 11 with its low frequency module 23 in the depression 17 of enclosure 18. Also shown here is an alternate parallel approach for the feed cable 22 to the antenna 11 that is advantageous for some applications. The feed cable 22 is brought through a hole in the bottom-side-wall corner of depression 17 adjacent to the antenna feed point (as shown more clearly in FIG. 6).

Figure 6:
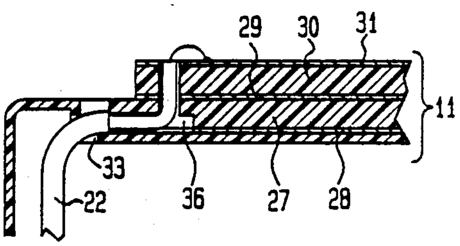
FIG. 6 is an enlarged, cross sectional, detail view of a portion of FIG. 5 showing a modified arrangement for feeding the antenna.

FIG. 6 is an enlarged cross sectional view taken at the plane 6, 6 in FIG. 5 to show in more detail the parallel approach for feed cable 22 to the antenna 11. In FIG. 6 it can be seen that the aforementioned hole, i.e. hole 33, is at the junction of the side wall and the bottom of the depression 17 in enclosure 18. Cable 22 passes through that hole, and its center conductor and enclosing insulating spacer extend along a groove 36 cut in conductive layer 28 and partly into dielectric layer 27 from the edge of the antenna 11 to the feed point hole. At that hole, the center conductor and insulating spacer are turned upward (as shown in FIG. 6) to pass through the rest of the antenna 11 stack for connection to conductive layer 31 as described before. The outer shield conductor of cable 22 is soldered (not shown) to layer 28 on both sides of the groove 36.

A short length of feed cable 22 is exposed between antenna 11 and the point of passage through hole 33. It has been found that because that length is so short, and because the cable shield is connected to conductive layer 28 which is in contact with grounded enclosure 18 (as indicated in FIG. 6), the cable 22 has no significant effect on the operation of the antenna. Consequently, it is not necessary to take special measures during manufacturing to tune the length of cable 22 or its shield conductor.

Although the invention has been described in connection with particular embodiments thereof, other embodiments, applications, and modifications thereof which will be obvious to those skilled in the art are included within the spirit and scope of the invention. For example, antenna 11 can be placed between the housing 13 and enclosure 18 in other locations within the unit 10; or the relative penetration of antenna 11 into housing 13 and enclosure 18 can be varied, e.g., to be entirely within one or the other.

What is claimed is:

1. A portable radio communication unit comprising:

a housing formed of an electrically nonconductive material;

a microstrip, folded-slot antenna secured to a wall of said housing, said antenna having a width dimension oriented substantially parallel to said wall, having a depth dimension substantially perpendicular to said wall, and having a ratio of antenna width to antenna depth selected to fix a predetermined frequency bandwidth characteristic for said antenna;

said antenna comprising two folded-slot, antenna modules in a stack for predetermined high and low frequency bands, respectively, corresponding to portable, cellular, radiotelephone, receive and transmit bands, respectively;

said housing has a predetermined inside width;

said stack has a depth which is substantially less than the width thereof in any direction in a plane of congruent edges of a major surface of a low frequency band module of said stack;

said low frequency band module has a width dimension which substantially fills an otherwise unoccupied portion of said inside width of said housing;

said low frequency band module includes a layer of dielectric material of predetermined thickness and dielectric constant, said thickness and dielectric constant being determined in relation to the width of said low frequency band module to establish an operating bandwidth spanning at least said cellular radiotelephone transmit band;

electrical apparatus contained within an electrically conductive enclosure secured within said housing;

means for securing said antenna to an exterior wall of said conductive enclosure in electrical contact with said conductive enclosure exterior wall and between said housing and said conductive enclosure;

means for electrically connecting said antenna with said apparatus, said connecting means comprising at least two electrical conductors extending between said antenna and said apparatus, at least one of said conductors being insulated;

a drive point on said antenna at a point of at least approximate impedance match for said conductors and a hole through said stack at said drive point and through which said insulated conductor is extended, parallel to said depth of said stack and perpendicular to said plane of congruent edges, for connection one of said modules which is an exterior module of said stack;

means connecting a second one of said conductors to another one of said modules which is an exterior module of said stack;

a groove in one of said modules from an edge thereof to said hole at said drive point, said groove being of sufficient depth and width to accommodate a section of said insulated conductor, and a pass-through hole in said conductive enclosure adjacent to an end of said groove at an edge of said stack for passing said conductors between said antenna and said apparatus.

2. The radio communication unit in accordance with claim 1 in which said conductive enclosure comprises:

a depression said exterior wall of said conductive enclosure of sufficient depth and expanse to receive at least one of said modules; and said pass-through hole is located at a corner formed by a bottom and a side wall of said depression.

3. The radio communication unit in accordance with claim 2 in which:

said housing includes a recess in an inside wall thereof in registration with said depression in said conductive enclosure and of sufficient depth and expanse to receive at least another of said modules.

4. The radio communication unit in accordance with claim 3 in which:

a portion of said conductive enclosure exterior wall including said bottom of said enclosure depression has a predetermined radius of curvature; and said stack is formed of mechanically flexible material and is secured into said depression flexed to conform to said radius of curvature and in electrical contact with said bottom of said conductive enclosure.

5. The radio communication unit in accordance with claim in which said one module is said high frequency module of said antenna, and said another module is said low frequency module of said antenna.

* * * * *